(12) United States Patent
Seol

(10) Patent No.: US 12,179,721 B2
(45) Date of Patent: Dec. 31, 2024

(54) BRAKE SYSTEM OF AUTONOMOUS DRIVING VEHICLE AND CONTROLLING METHOD THEREOF

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 616 days.

(21) Appl. No.: 17/520,002

(22) Filed: Nov. 5, 2021

(65) Prior Publication Data

US 2022/0203951 A1 Jun. 30, 2022

(30) Foreign Application Priority Data

Dec. 31, 2020 (KR) .................. 10-2020-0188858

(51) Int. Cl.
*B60T 13/74* (2006.01)
*B60T 8/171* (2006.01)
(Continued)

(52) U.S. Cl.
CPC ............ *B60T 13/745* (2013.01); *B60T 8/171* (2013.01); *B60T 8/326* (2013.01); *H02P 6/24* (2013.01);
(Continued)

(58) Field of Classification Search
CPC ........ B60T 13/745; B60T 8/171; B60T 8/326; B60T 2220/04; B60T 2250/00;
(Continued)

(56) References Cited

U.S. PATENT DOCUMENTS 6,099,086 A * 8/2000 Feigel .................... B60T 15/14
303/155
6,390,565 B2 * 5/2002 Riddiford ............... B60T 13/66
303/3

(Continued)

FOREIGN PATENT DOCUMENTS

CN 103260981 A 8/2013
CN 112105533 A 12/2020
(Continued)

OTHER PUBLICATIONS

Chinese Office Action issued Jun. 9, 2023 in corresponding Chinese Patent Application No. 202111680487.9.
(Continued)

*Primary Examiner* — Bradley T King
(74) *Attorney, Agent, or Firm* — NovoTechIP International PLLC

(57) ABSTRACT

In accordance with some embodiments, the present disclosure provides A brake system for braking a vehicle using one or both of a main braking system and a redundancy braking system, the brake system comprising: a brake demand detecting unit configured to detect a driver's brake demand; an electronic control unit comprising: a pressure controller configured to control a pressure inside a master cylinder in response to a value detected by the brake demand detecting unit, wherein the internal pressure of the master cylinder is controlled by generating an electrical signal for a first demand current; a motor position controller configured to control a position of a motor by generating an electrical signal for a second demand current; and a current controller configured to control the current of the motor in response to an electrical signal received from one of the motor position controller and the pressure controller; a position detecting unit configured to detect a position of a rotor of the motor;
(Continued)

and a pressure detecting unit configured to sense the internal pressure of the master cylinder.

13 Claims, 4 Drawing Sheets

(51) Int. Cl.
*B60T 8/32* (2006.01)
*H02P 6/24* (2006.01)

(52) U.S. Cl.
CPC ....... *B60T 2220/04* (2013.01); *B60T 2250/00* (2013.01); *B60T 2270/402* (2013.01); *B60T 2270/413* (2013.01); *B60T 2270/88* (2013.01)

(58) Field of Classification Search
CPC ......... B60T 2270/402; B60T 2270/413; B60T 2270/88; H02P 6/24
See application file for complete search history.

(56) References Cited

U.S. PATENT DOCUMENTS

| | | | | |
|---|---|---|---|---|
| 6,669,310 B2* | 12/2003 | Obuchi | ................... | B60T 8/885 303/122.04 |
| 6,969,126 B2* | 11/2005 | Ichinose | ................. | B60T 7/042 188/1.11 R |
| 7,634,345 B2* | 12/2009 | Karnjate | ................. | B60T 7/042 303/189 |
| 7,805,232 B2* | 9/2010 | Karnjate | ................. | B60T 7/042 303/121 |
| 8,255,103 B2* | 8/2012 | Karnjate | ................. | B60T 7/042 701/22 |
| 9,889,836 B2* | 2/2018 | Mahnkopf | ............ | B60T 13/575 |
| 2014/0303865 A1* | 10/2014 | Bohm | ....................... | B60T 8/17 701/70 |
| 2019/0100172 A1 | 4/2019 | Lee | | |
| 2020/0384965 A1 | 12/2020 | Park | | |
| 2021/0354679 A1* | 11/2021 | Putz | ..................... | B60T 17/221 |
| 2023/0042441 A1* | 2/2023 | Fujita | ................... | B60T 13/741 |

FOREIGN PATENT DOCUMENTS

| | | |
|---|---|---|
| GB | 1305462 A | 1/1973 |
| GB | 2478800 A | 9/2011 |
| JP | 2013006526 A | 1/2013 |
| WO | 2012118103 A1 | 9/2012 |

OTHER PUBLICATIONS

Extended European Search Report issued May 6, 2022 in corresponding European Patent Application No. 21208585.6.

* cited by examiner

BRAKE SYSTEM OF AUTONOMOUS DRIVING VEHICLE AND CONTROLLING METHOD THEREOF

CROSS-REFERENCE TO RELATED APPLICATIONS

The present application is based on, and claims priority from, Korean Patent Application Number 10-2020-0188858, filed Dec. 31, 2020, the disclosure of which is hereby incorporated by reference herein in its entirety.

BACKGROUND OF THE INVENTION

1. Field of the Invention

The present disclosure relates to a brake system of an autonomous vehicle and a control method thereof.

2. Discussion of Related Art

The statements in this section merely provide background information related to the present disclosure and do not necessarily constitute prior art.

The statements in this section merely provide background information related to the present disclosure and may not constitute related art.

FIG. 1 shows a flowchart of a control method of a conventional brake system and a graph of a change in pressure with time.

A control method 100 of a conventional brake system will be described with reference to FIG. 1A. Information regarding a demand pressure is input from a stroke sensor (not shown) of a brake pedal (not shown) to an electronic control unit (not shown). The electronic control unit generates a demand current 112 using a pressure controller 110 for controlling the internal pressure of a master cylinder (not shown). Here, the pressure controller 110 forms the demand current 112 by using the difference between the demand pressure and the internal pressure of the pre-formed master cylinder. The demand current 112 is input to the current controller 120 formed to control a current applied to a motor. In this case, information on the difference between the demand current 112 and the current pre-applied to the motor may be input to the current controller 120. Subsequently, the current controller 120 transfers a pulse width modulation (PWM) duty command to an inverter 130 (122). The inverter 130 inputs PWM duty to the motor 140 (132), and the motor 140 changes a corresponding torque or position (142).

Meanwhile, a conventional brake system includes a redundancy braking system (RCU) to secure redundancy when a main braking system ((integrated MOBIS Electronic Brake (iMEB)) fails. The RCU includes a plurality of valves to secure functions such as an anti-lock braking system (ABS) or an electronic stability control (ESC). The addition of the valves causes an orifice effect on a conduit of a braking system, and thus there is a problem in that a hydraulic response delay occurs. Referring to FIG. 1B, it can be seen that there is a delay in wheel pressure formation with the iMEB alone compared to the circuit pressure and there is a further delay in the wheel pressure formation when the RCU is added. Here, the circuit pressure refers to an internal hydraulic pressure of the master cylinder generated by pressurization of the master cylinder.

In order to improve the hydraulic response performance of the wheel, the circuit pressure should be set to be higher than the demand pressure. However, as can be seen from FIG. 1A, the PWM duty is inevitably reduced because the pressure of the master cylinder formed by the control method 100 is greater than the input demand pressure. Accordingly, the voltage output is decreased, and the response performance cannot be improved. In particular, the amount of brake oil necessary for a caliper to press a wheel in the early stage of braking is large. Therefore, in the early stage of braking, the response performance delay is more problematic.

BRIEF SUMMARY OF THE INVENTION

In accordance with some embodiments, the present disclosure provides A brake system for braking a vehicle using one or both of a main braking system and a redundancy braking system, the brake system comprising: a brake demand detecting unit configured to detect a driver's brake demand; an electronic control unit comprising: a pressure controller configured to control a pressure inside a master cylinder in response to a value detected by the brake demand detecting unit, wherein the internal pressure of the master cylinder is controlled by generating an electrical signal for a first demand current; a motor position controller configured to control a position of a motor by generating an electrical signal for a second demand current; and a current controller configured to control the current of the motor in response to an electrical signal received from one of the motor position controller and the pressure controller; a position detecting unit configured to detect a position of a rotor of the motor; and a pressure detecting unit configured to sense the internal pressure of the master cylinder.

DETAILED DESCRIPTION OF THE INVENTION

Figure 1:
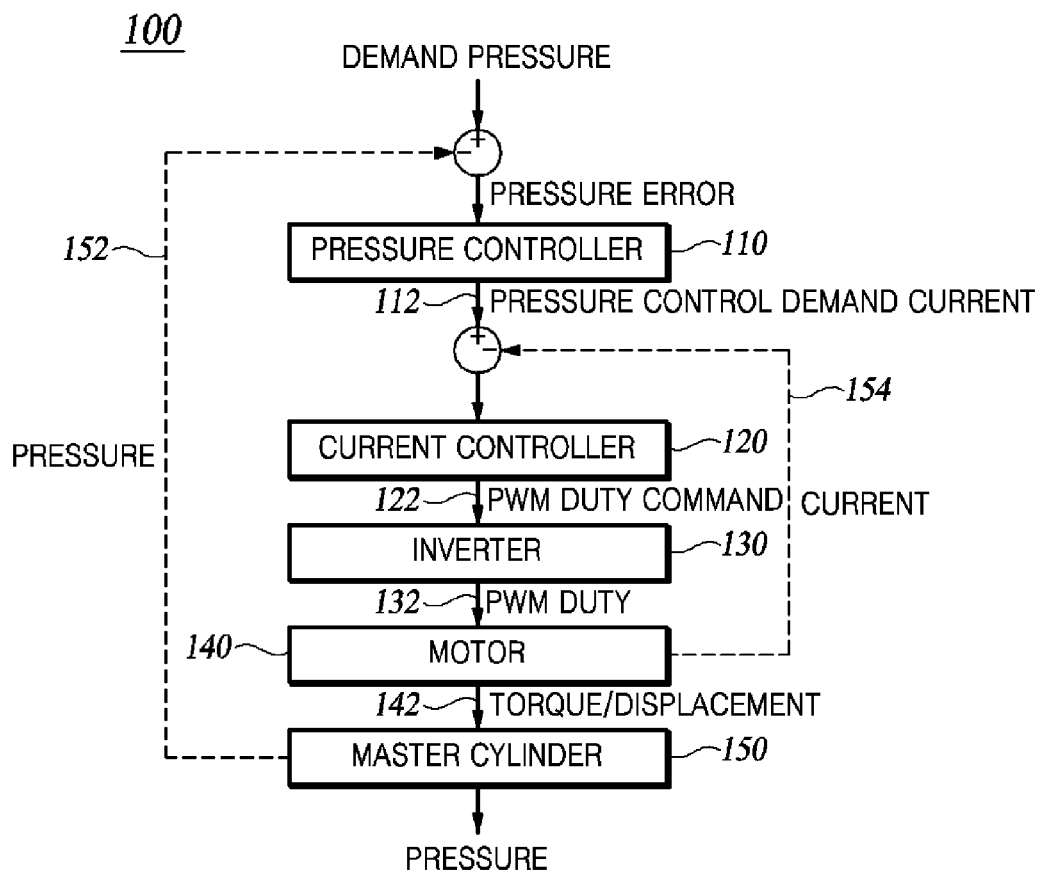
FIG. 1 shows a flowchart of a control method of a conventional brake system and a graph of a change in pressure with time.
Figure 1:
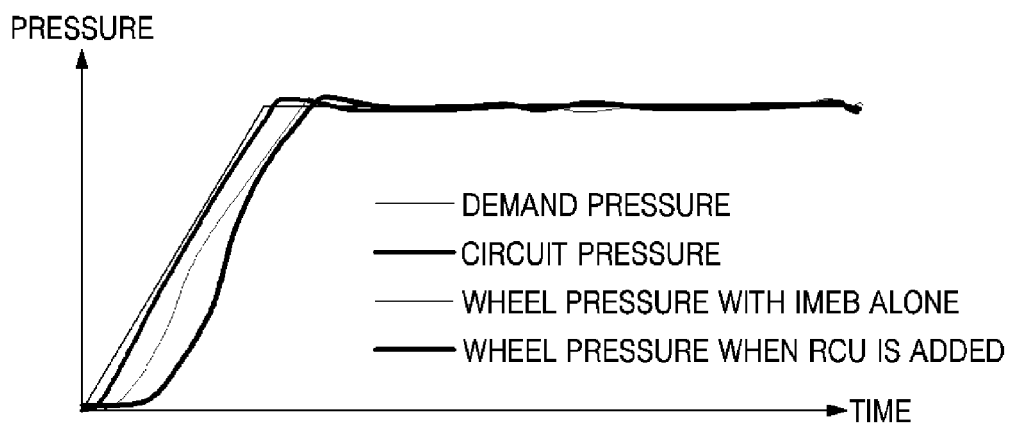

In Some embodiments of the present disclosure will now be described in detail with reference to exemplary drawings. It should be noted that, when reference numerals are added to the components in each drawing, the same components have the same numerals as possible, even if they are shown on different drawings. In the description of the present disclosure, a detailed description of a related known configuration or function is omitted when it is determined that the gist of the disclosure can be made.

In describing the components of the embodiments in accordance with the present disclosure, reference numerals such as first, second, i), ii), a), and b) may be used. Such symbols are only for distinguishing the components from other components, and the nature or order of the components is not limited by the symbols. When a portion in the specification is referred to as "comprising" or "including" a component, it means that the component may further comprise other components rather than excluding other components unless explicitly stated to the contrary.

Figure 2:
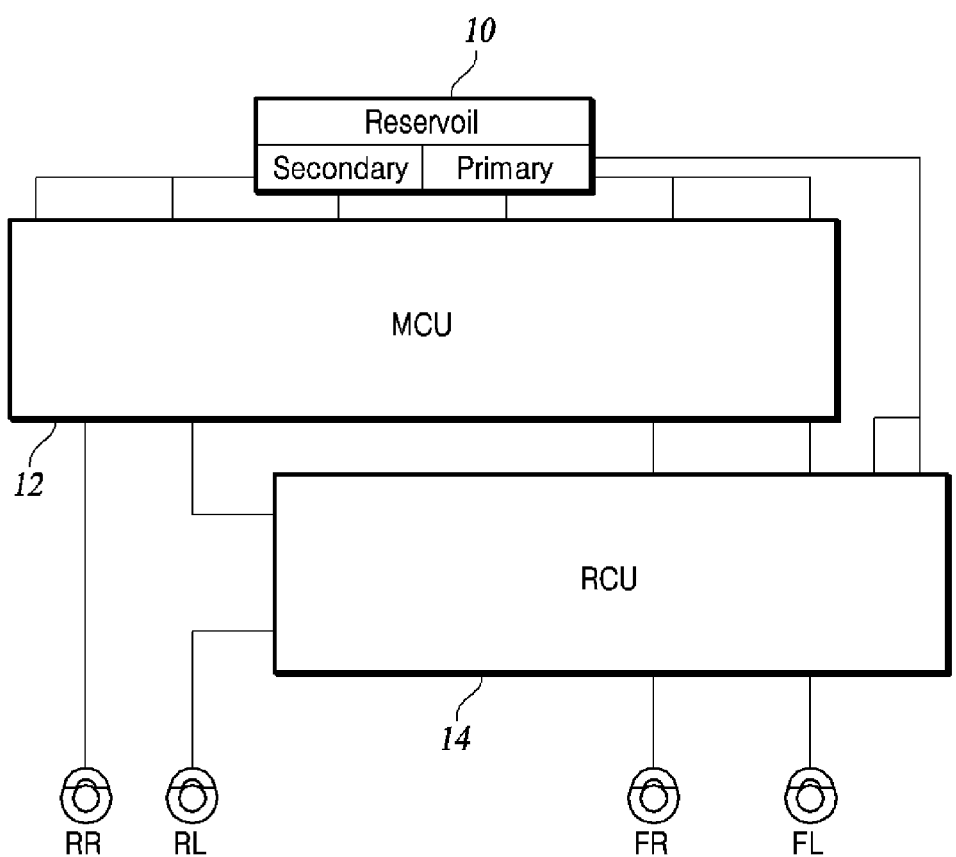
FIG. 2 is an exemplary diagram of a brake system according to an embodiment of the present disclosure.

FIG. 2 is an exemplary diagram of a brake system according to an embodiment of the present disclosure.

Referring to FIG. 2, a brake system 1 according to an embodiment includes some or all of a main braking system 12, a redundancy braking system 14, and a plurality of wheel brake apparatuses FR, FL, RR, and RL.

The main braking system 12 is configured to transfer at least a portion of brake oil discharged from a reservoir to a plurality of wheel brake apparatuses FR, FL, RR, and RL.

The redundancy braking system 14 is disposed between the main braking system 12 and the plurality of wheel brake apparatuses FR, FL, RR, and RL and is configured to transfer at least a portion of the brake oil discharged from the main braking system 12 to the plurality of wheel brake apparatuses FR, FL, RR, and RL.

When a failure occurs in the main braking system 12, the redundancy braking system 14 may form an appropriate hydraulic pressure so that a braking force corresponding to the depression of a brake pedal (not shown) is provided to the plurality of wheel brake apparatuses FR, FL, RR, and RL. To this end, the redundancy braking system 14 includes one or more valves.

Figure 3:
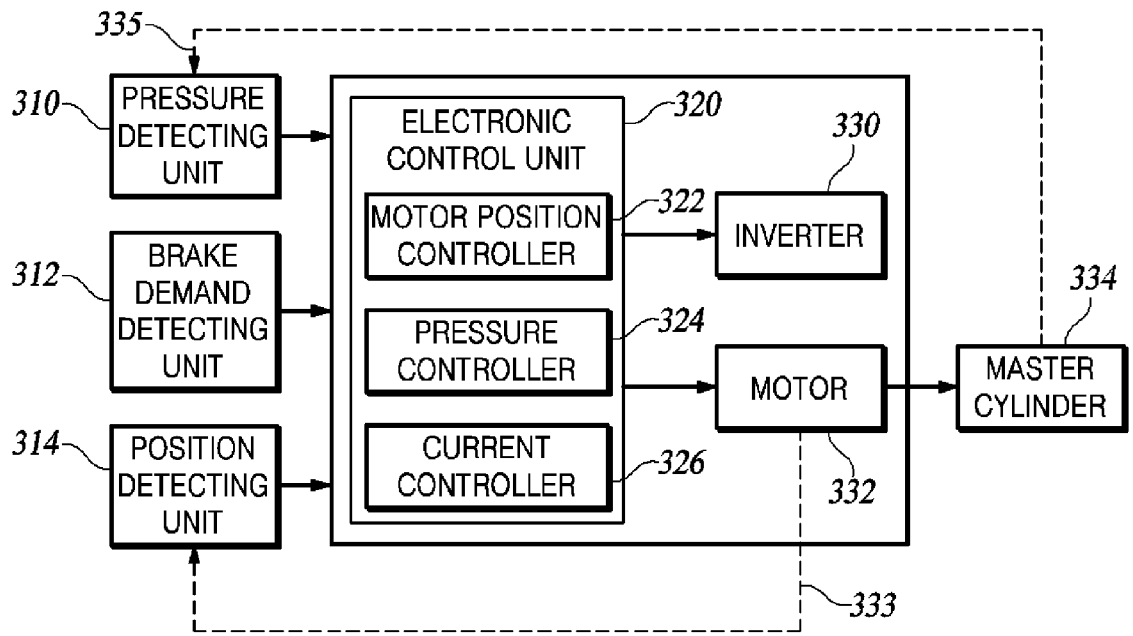
FIG. 3 is a block diagram showing components of a pressure electronic control unit of a brake system according to an embodiment of the present disclosure.

FIG. 3 is a block diagram showing components of a pressure electronic control unit of a brake system according to an embodiment of the present disclosure.

At least a portion of the pressure electronic control unit of the brake system 1 is included in the main braking system 12. Referring to FIG. 3, the press electronic control unit according to an embodiment includes some or all of a pressure detecting unit 310, a brake demand detecting unit 312, a position detecting unit 314, an electronic control unit 320, an inverter 330, a motor 332, and a master cylinder 334.

The pressure detecting unit 310 is formed to detect the pressure of brake oil formed by the pressurization inside the master cylinder 334 (hereinafter referred to as "formed pressure"). For example, the pressure detecting unit 310 may be a pressure sensor that detects a pressure inside a conduit disposed adjacent to a discharge port of the master cylinder 334. Information regarding the formed pressure measured by the pressure detecting unit 310 is input to the electronic control unit 320.

The brake demand detecting unit 312 is formed to measure a pedal stroke when a driver is pedaling. As an example, the brake demand detecting unit 312 is a pedal stroke sensor. Information on the pedal stroke measured by the brake demand detecting unit 312 is input to the electronic control unit 320.

The position detecting unit 314 is formed to detect the position of a rotor of the motor 332. As an example, the position detecting unit 314 may be a hall sensor. However, the present disclosure is not necessarily limited thereto, and any sensor capable of detecting the position of the motor 332 may be appropriately employed in the art. Information on the position of the rotor of the motor 332 measured by the position detecting unit 314 is input to the electronic control unit 320.

The electronic control unit 320 is formed to compute a demand pressure and a demand position on the basis of information input from the pressure detecting unit 310, a brake demand detecting unit 312, and the position detecting unit 314. Here, the demand pressure is a pressure inside the master cylinder 334 in which a braking force provided to the plurality of wheel brake apparatuses FR, FL, RR, and RL may be formed. Also, the demand position refers to the position of the rotor of the motor 332 at which the demand pressure may be formed.

The electronic control unit 320 includes some or all of the motor position controller 322, a pressure controller 324, and a current controller 326.

The pressure controller 324 controls the motor 332 such that the internal pressure of the master cylinder 334 is the demand pressure. As an example, pressure control may be performed by controlling the torque of the motor 332. The pressure controller 324 computes a first demand current PCout and generates an associated electrical signal. Here, the first demand current PCout refers to a current that should be applied to the motor 332 so that the current internal pressure of the master cylinder 334 becomes the demand pressure.

The pressure controller 324 computes the first demand current PCout on the basis of the current internal pressure 335 of the master cylinder 334. To this end, the pressure controller 324 may be a proportional integral (PI) controller.

When controlling the pressure control of the motor 332, the pressure controller 324 performs torque control. Since a change in pressure inside the master cylinder 334 occurs in proportion to the magnitude of the torque, it is possible to precisely control the pressure of the master cylinder 334.

The motor position controller 322 controls the motor 332 such that the position of the motor 332 becomes the demand position. As an example, the motor position controller 322 controls the number of rotations of the rotor included in the motor 332 or performs control such that the rotor is placed at an accurate position. The motor position controller 322 generates an electrical signal for a second demand current PoCout. Here, the second demand current PoCout refers to a current that should be applied to the motor 332 so that the current position of the motor 332 becomes the demand position of the motor 332.

The motor position controller 322 computes the second demand current PoCout on the basis of the current position 333 of the motor 332. To this end, the motor position controller 322 may be a PI controller.

When controlling the position of the motor, the motor position controller 322 may have quick responsiveness. Since control is performed using an absolute position regardless of the speed and torque of the motor 332, there is an advantage in that the responsiveness is quick.

The brake system 1 according to the present disclosure initially secures responsiveness through the position control of the motor 332 and then secures accuracy through the pressure control of the motor 332. Accordingly, upon the formation of a braking force, the hydraulic response performance is improved, and the demand performance of the brake system 1 is satisfied.

The current controller 326 is configured to control a current applied to the motor 332. Specifically, the current controller 326 controls at least a portion of the brake system 1 such that one of the first demand current PCout and the second demand current PoCout is applied to the motor 332 on the basis of information on the current of the motor 332. In this case, the electronic control unit 320 compares the magnitudes and polarities of the first demand current PCout and the second demand current PoCout and selects one of the motor position controller 322 and the current controller 326.

The current controller 326 generates a pulse width modulation (PWM) duty signal on the basis of a current applied to the motor 332. To this end, the current controller 326 may be a PI controller, and current control corresponds to a closed-loop system.

The inverter 330 receives a PWM duty signal from the current controller 326. The inverter 330 performs PWM control on the motor 332 on the basis of the received PWM duty signal.

The voltage or current of the motor 332 may be controlled by the PWM received from the inverter 330. In this case, information regarding the position of the motor 332 may be detected by the position detecting unit 314. That is, the position control of the motor 332 corresponds to a closed-loop system.

The master cylinder 334 has an internal pressure changing due to the actuating of the motor 332. Specifically, according to the rotational motion of the motor 332, a piston (not shown) formed inside the master cylinder 334 moves in a straight line. Thus, the internal volume of the master cylinder 334 increases or decreases, and thus the pressure of the brake oil accommodated in the master cylinder 334 changes. Information regarding the internal pressure of the master cylinder 334 may be detected by the pressure detecting unit 310. That is, the internal-pressure control of the master cylinder 334 corresponds to a closed-loop system.

Figure 4:
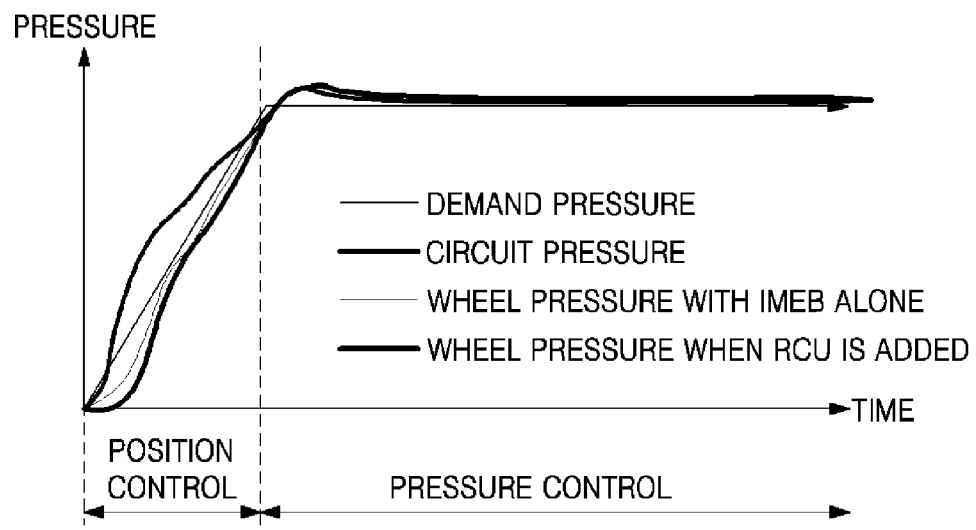
FIG. 4 is a graph showing a change in pressure of a brake system with time according to an embodiment of the present disclosure.

FIG. 4 is a graph showing a change in pressure of a brake system with time according to an embodiment of the present disclosure.

A pressure forming operation of the brake system 1 over time according to the present disclosure will be described with reference to FIG. 4. In the early stage of braking, the circuit pressure is controlled through the position control of the motor 332. In the early stage of braking, the formed pressure may be greater than the demand pressure due to the position control of the motor 332. Accordingly, it can be seen that a change in pressure in the case of the iMEB alone or in the case of the RCU being additionally included is improved compared to the conventional brake system according to FIG. 1.

Also, the circuit pressure is controlled through the pressure control of the motor 332, beginning from when the circuit pressure becomes equal to the wheel brake pressure. In this case, the point at which the circuit pressure and the wheel brake pressure become equal corresponds to the point at which the influence of the orifice by each braking unit (iMEB and RCU) is minimized. Meanwhile, in the middle and late stages of braking, precise pressure control is possible due to the pressure control of the motor 332.

Figure 5:
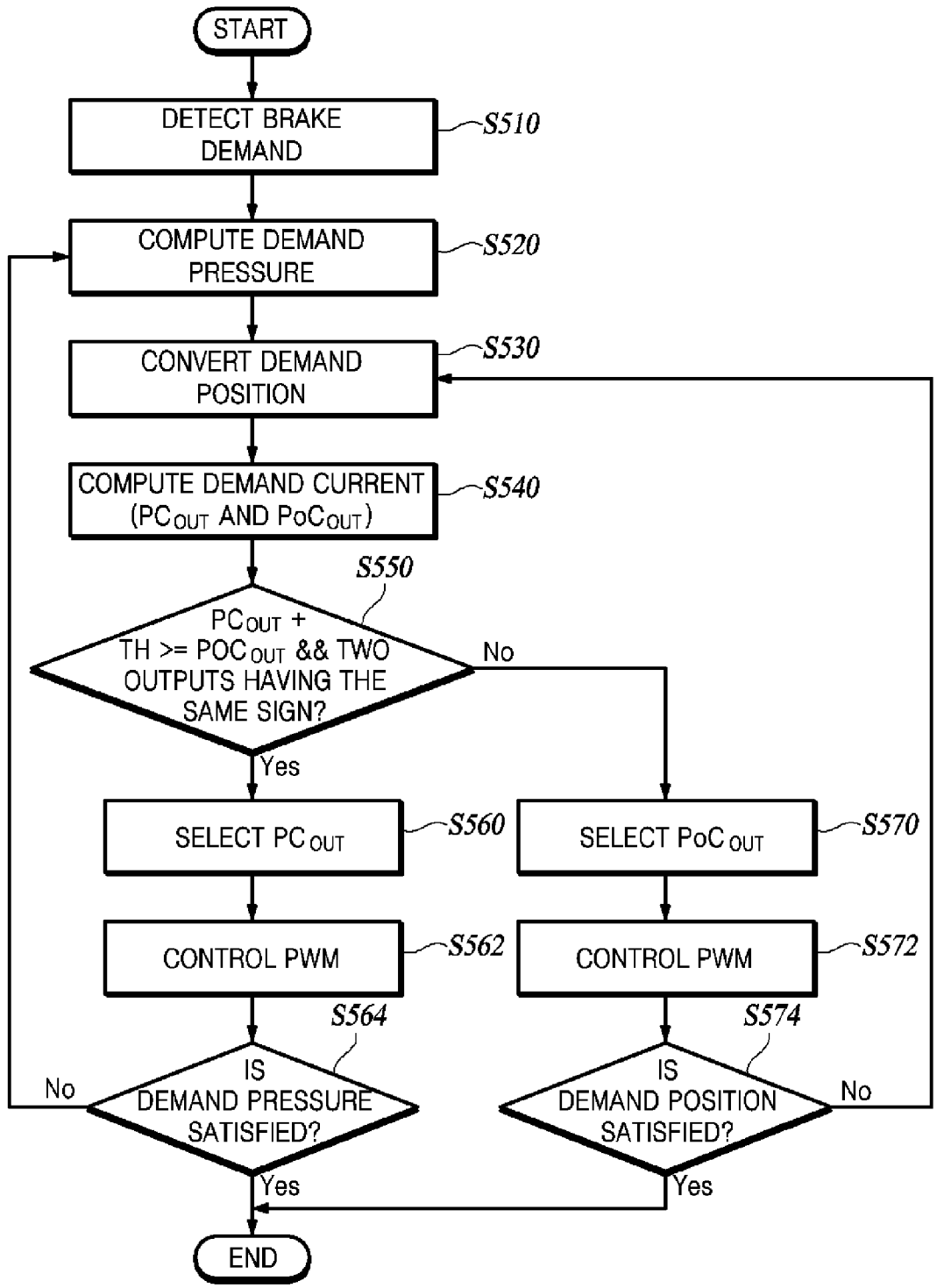
FIG. 5 is a flowchart of a control method of a brake system according to an embodiment of the present disclosure.

FIG. 5 is a flowchart of a control method of a brake system according to an embodiment of the present disclosure.

Referring to FIG. 5, the control method of the brake system 1 according to the present disclosure includes an operation in which a driver's brake demand is detected by the brake demand detecting unit 312 (S510). In this case, the brake demand may be determined by the driver's pedaling.

Subsequently, the demand pressure is computed to correspond to the driver's brake demand measured by a pedal stroke sensor (S520). Here, the demand pressure is an internal pressure of the master cylinder 334 that is computed by the electronic control unit 320 in order to provide a braking force necessary for the plurality of wheel brake apparatuses FR, FL, RR, and RL.

The electronic control unit 320 computes the demand position of the motor 332 on the basis of the demand pressure (S530). Here, the demand position refers to the position of the rotor of the motor 332 that is computed by the electronic control unit 320 so that the internal pressure of the master cylinder 334 changes to the demand pressure.

The pressure controller 324 included in the electronic control unit 320 computes the first demand current PCout on the basis of the demand pressure. In this case, the pressure controller 324 is formed to compute the first demand current PCout by using the difference from the current pressure formed inside the master cylinder 334. Also, the motor position controller 322 included in the electronic control unit 320 computes the second demand current PoCout on the basis of the demand position. In this case, the motor position controller 322 computes the second demand current PoCout using the current position of the rotor of the motor 332 (S540).

The electronic control unit 320 compares the magnitudes and polarities of the first demand current PCout and the second demand current PoCout and selects one of the pressure controller 324 and the motor position controller 322 (S550). Specifically, when the first demand current PCout and the second demand current PoCout have the same polarity and a value obtained by subtracting the first demand current PCout from the second demand current PoCout, i.e., the difference between the two demand currents, is less than or equal to a predetermined threshold TH, the first demand current PCout is selected as an input value of the current controller 326 (S560).

The current controller 326 generates a PWM duty signal using the first demand current PCout and the current being applied to the motor 332. The generated PWM duty signal is applied to the inverter 330, and the inverter 330 controls the motor 332 (S562).

When the internal pressure of the master cylinder 334 changes due to the activation of the motor 332, it is determined whether the internal pressure of the master cylinder 334 satisfies the demand pressure (S564). When it is determined that the internal pressure of the master cylinder 334 satisfies the demand pressure, the electronic control unit 320 ends the control of the motor 332.

Meanwhile, when it is determined that the internal pressure of the master cylinder 334 does not satisfy the demand pressure, the electronic control unit 320 repeats operations S520 to S562.

In operation S560, specifically, when the first demand current PCout and the second demand current PoCout have different polarities or when the difference between the first demand current PCout and the second demand current PoCout is greater than the predetermined threshold TH, the first demand current PCout is selected as an input value of the current controller 326 (S570).

The current controller 326 generates a PWM duty signal using the second demand current PoCout and the current being applied to the motor 332. The generated PWM duty signal is applied to the inverter 330, and the inverter 330 controls the motor 332 (S572).

Subsequently, it is determined whether the changed position of the motor 332 satisfies the demand position (S574). When it is determined that the position of the motor 332 satisfies the demand position, the electronic control unit 320 ends the control of the motor 332.

Meanwhile, when it is determined that the position of the motor 332 does not satisfy the demand position, the electronic control unit 320 repeats operations S530 to S572.

As described above, according to the present embodiment, it is possible for a brake system to improve hydraulic response performance in the early stage of braking by including a pressure controller and a motor position controller in parallel.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

What is claimed is:

1. A brake system for braking a vehicle using one or both of a main braking system and a redundancy braking system, the brake system comprising:
    a brake demand detecting unit configured to detect a driver's brake demand;
    a position detecting unit configured to detect a position of a rotor of a motor;
    a pressure detecting unit configured to detect an internal pressure of a master cylinder; and
    an electronic control unit comprising:
        a pressure controller configured to generate, based on the detected driver's brake demand, a first demand current that controls the internal pressure of the master cylinder;
        a motor position controller configured to generate a second demand current that controls a position of the rotor of the motor; and
        a current controller configured to control a current for controlling the motor based on the first or second demand current,
    wherein the electronic control unit is further configured to select the first demand current when the first and second demand currents have a same polarity and a difference between the first and second demand currents is less than or equal to a predetermined threshold.

2. The brake system of claim 1, wherein the electronic control unit is further configured to select the second demand current when the first and second demand currents have different polarities or the difference between the first and second demand currents is greater than the predetermined threshold.

3. The brake system of claim 2, wherein the electronic control unit is further configured to provide the selected one of the first and second demand currents to the current controller to control the current for controlling the motor.

4. The brake system of claim 3, further comprising an inverter configured to:
    receive a pulse width modulation (PWM) duty signal from the current controller; and
    convert the received PWM duty signal to the current for controlling the motor.

5. The brake system of claim 1, wherein the brake demand detecting unit comprises a pedal stroke sensor configured to sense the driver's brake demand.

6. A method of controlling a brake system, comprising:
    detecting a driver's brake demand;
    calculating an internal pressure of a master cylinder required to generate a brake pressure corresponding to the detected driver's brake demand;
    determining a position of a rotor of a motor required to obtain the calculated internal pressure at the master cylinder;
    generating a first demand current that causes the motor to generate the calculated internal pressure at the master cylinder;
    generating a second demand current that causes the motor to place the rotor at the determined position; and
    selecting the first demand current when the first and second demand currents have a same polarity and a difference between the first and second demand currents is less than or equal to a predetermined threshold.

7. The method of claim 6, further comprising selecting the second demand current when the first and second demand currents have different polarities or the difference between the first and second demand currents is greater than the predetermined threshold.

8. The method of claim 7, further comprising providing the selected one of the first and second demand currents to a current controller to control a current for controlling the motor.

9. The method of claim 8, further comprising:
    receiving a pulse width modulation (PWM) duty signal from the current controller; and
    converting the received PWM duty signal to the current for controlling the motor.

10. The method of claim 9, further comprising determining whether a current internal pressure of the master cylinder corresponds to the calculated internal pressure.

11. The method of claim 10, further comprising:
    stopping applying the first demand current to the motor when the current internal pressure of the master cylinder corresponds to the calculated internal pressure; and
    adjusting the first demand current applied to the motor when the current internal pressure of the master cylinder does not correspond to the calculated internal pressure.

12. The method of claim 9, further comprising determining whether the rotor of the motor is positioned at the determined position.

13. The method of claim 12, further comprising:
    stopping applying the second demand current to the motor when the rotor is positioned at the determined position; and
    adjusting the second demand current applied to the motor when the rotor is not positioned at the determined position.

* * * * *